United States Patent
Hsu et al.

(10) Patent No.: US 7,085,886 B2
(45) Date of Patent: Aug. 1, 2006

(54) AUTONOMIC POWER LOSS RECOVERY FOR A MULTI-CLUSTER STORAGE SUB-SYSTEM

(75) Inventors: Yu-Cheng Hsu, Tucson, AZ (US); Vernon J. Legvold, Tucson, AZ (US)

(73) Assignee: International Buisness Machines Corporation, Armonk, NY (US)

( * ) Notice: Subject to any disclaimer, the term of this patent is extended or adjusted under 35 U.S.C. 154(b) by 323 days.

(21) Appl. No.: 10/446,911

(22) Filed: May 28, 2003

(65) Prior Publication Data

US 2004/0255181 A1    Dec. 16, 2004

(51) Int. Cl.
*G06F 12/08* (2006.01)
(52) U.S. Cl. .................. 711/120; 711/161; 711/162; 707/104; 714/6
(58) Field of Classification Search ............... 711/120, 711/161, 162; 707/104; 714/6
See application file for complete search history.

(56) References Cited

U.S. PATENT DOCUMENTS

| 5,437,022 | A |   | 7/1995  | Beardsley et al. |
| 5,454,099 | A |   | 9/1995  | Myers et al. |
| 5,488,731 | A |   | 1/1996  | Mendelsohn |
| 5,548,711 | A |   | 8/1996  | Brant et al. |
| 5,586,291 | A |   | 12/1996 | Lasker et al. |
| 5,588,110 | A |   | 12/1996 | DeKoning et al. |
| 5,640,530 | A |   | 6/1997  | Beardsley et al. |
| 5,682,513 | A |   | 10/1997 | Candelaria et al. |
| 5,771,367 | A | * | 6/1998  | Beardsley et al. .......... 711/162 |
| 5,774,643 | A |   | 6/1998  | Lubbers et al. |
| 5,835,955 | A |   | 11/1998 | Dornier et al. |
| 5,870,537 | A |   | 2/1999  | Kern et al. |
| 5,928,367 | A |   | 7/1999  | Nelson et al. |
| 5,968,182 | A |   | 10/1999 | Chen et al. |
| 6,006,342 | A | * | 12/1999 | Beardsley et al. ............. 714/5 |
| 6,173,374 | B1 | * | 1/2001  | Heil et al. ................... 711/148 |
| 6,324,654 | B1 |  | 11/2001 | Wahl et al. |
| 6,378,037 | B1 |  | 4/2002  | Hall |
| 6,438,661 | B1 |  | 8/2002  | Beardsley et al. |

FOREIGN PATENT DOCUMENTS

JP        06-282386        10/1994

* cited by examiner

*Primary Examiner*—Matthew Kim
*Assistant Examiner*—Hetul Patel
(74) *Attorney, Agent, or Firm*—Dan Shifrin

(57) ABSTRACT

An improved storage controller and method for storing and recovering data are disclosed. The storage controller includes a first cluster for directing data from a host computer to a storage device and a second cluster for directing data from a host computer to a storage device. A first cache memory is connected to the first cluster and a second cache memory is connected to the second cluster. A first preserved area of memory is connected to the first cluster and a second preserved area of memory is connected to the second cluster. Data is directed to the first cache and backed up to the second preserved area in a normal operating mode. Similarly, data is directed to the second cache and backed up to the first preserved area in the normal operating mode. In the event of a power failure or comparable event, data from the first and second preserved areas are transferred to, and stored on, a first storage device. Additionally, data from the first and second preserved areas are transferred to, and stored on, a second storage device. Thus, upon resumption of normal operation, if one of the clusters subsequently fails to resume normal operations, data from the failed cluster is available through the operating cluster.

14 Claims, 8 Drawing Sheets

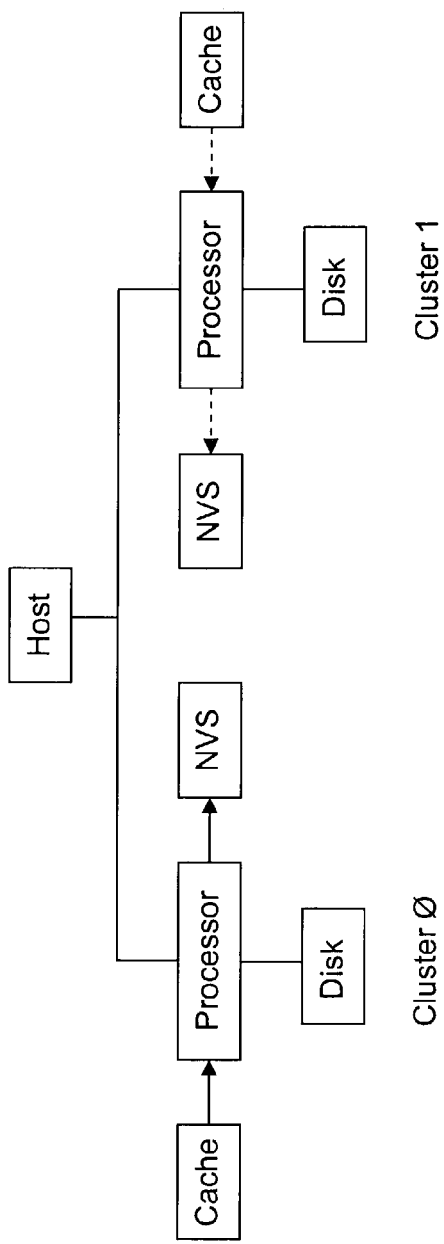
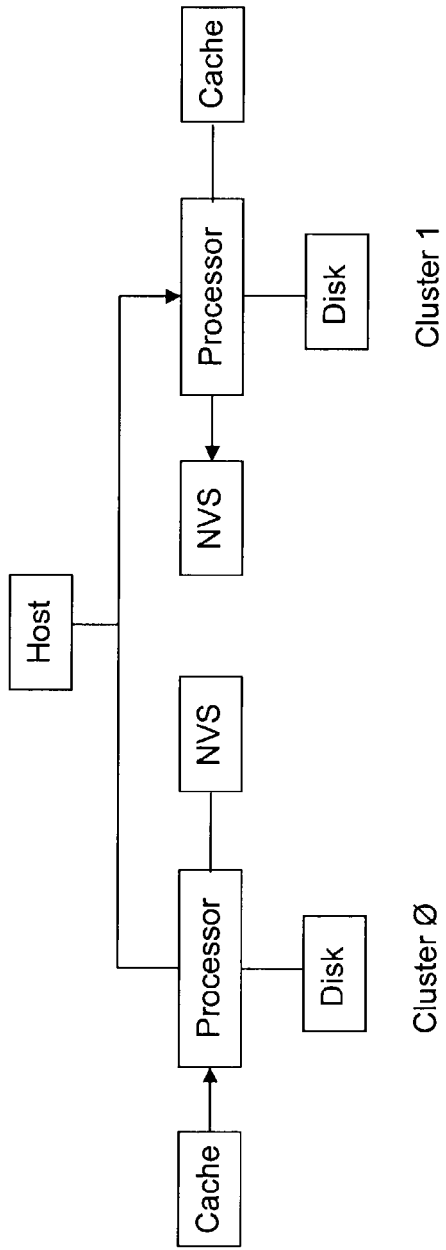
FIG. 3
(Prior Art)
FIG. 4
(Prior Art)

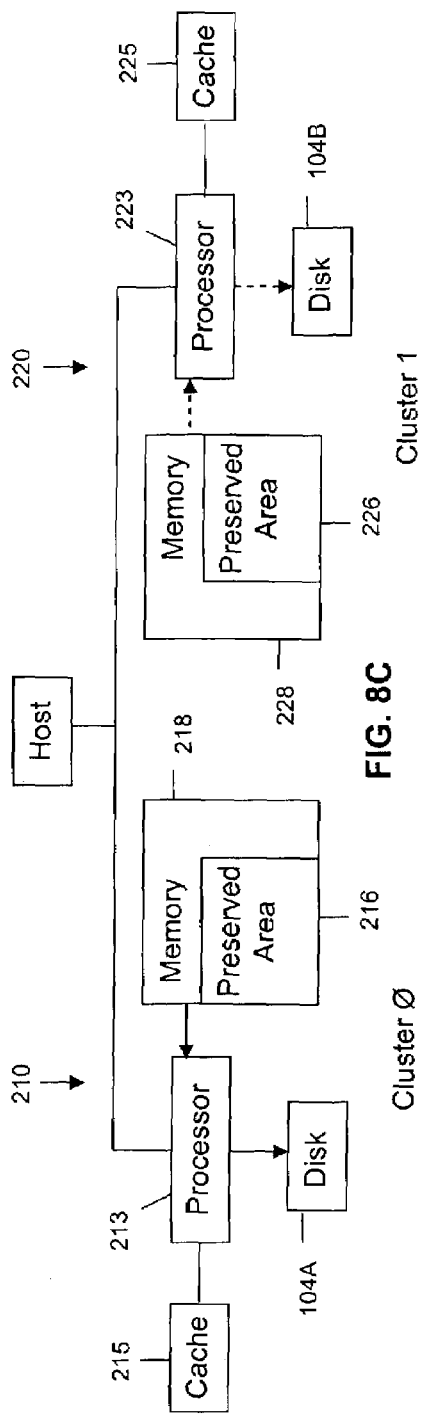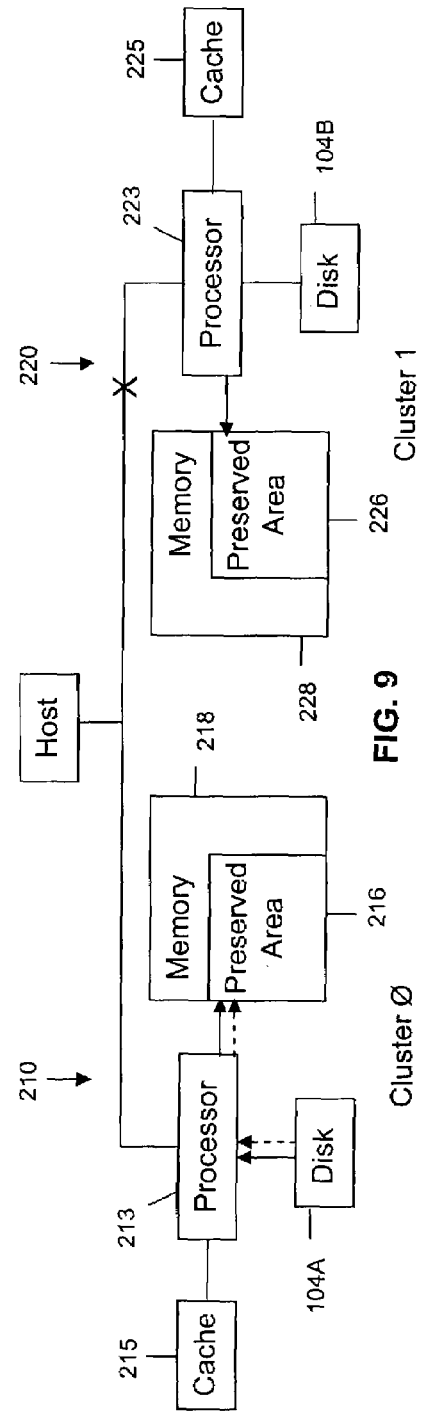

AUTONOMIC POWER LOSS RECOVERY FOR A MULTI-CLUSTER STORAGE SUB-SYSTEM

TECHNICAL FIELD

The present invention relates generally to the field of storage sub-systems and, in particular, to managing the transfer of data to prevent a loss if one cluster of a multi-cluster system fails to recover following a power loss or other comparable event.

BACKGROUND ART

In large distributed computing systems, a number of host computers are typically connected to a number of direct access storage devices (DASDs), such as tape or disk drive units, by a storage controller. Among other functions, the storage controller handles connection and disconnection between a particular computer and a DASD for transfer of a data record. In addition, the storage controller stores data in electronic memory for faster input and output operations.

The International Business Machines (IBM) Corporation (Armonk, N.Y.) Enterprise Storage Server™ ("ESS"), is an example of a storage controller which controls connections between magnetic disk units and host computers. The host computers are typically main frame systems such as the IBM 3090™, the Model ES/9000®, or other comparable systems.

A typical IBM storage controller can handle up to sixteen channels from host computers and up to sixty-four magnetic storage units. The host computers are connected to the storage controller by between one and four channels. A storage controller typically has two storage clusters, each of which provides for selective connection between a host computer and a direct access storage device and each preferably being on a separate power boundary. Each cluster might include a multipath storage director with first and second storage paths, a shared control array (SCA), a cache memory and a non-volatile storage ("NVS") memory. The SCA is a memory array which is shared over all storage paths.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. Data in cache is duplicated, in whole or in part, in nonvolatile memory. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced.

In each cluster, non-volatile storage serves as a backup to the cache for the buffering function (see FIG. 3). Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS, an indication is given to the host computer that the data was successfully stored.

A conventional storage control unit is typically designed so that no single point of failure in the unit will cause a failure of the entire system. The failure of certain components, however, can cause a degradation in performance of the control unit. A failure in cache, for example, typically results in such a performance degradation. Unfortunately, host systems have become tuned and therefore so reliant on the speed afforded by a fully functional cache, that the performance degradation associated with a failure in cache has the same effect as a single point failure.

The need in the art for a system and technique for mitigating performance degradation in a storage control unit associated with a failure in cache memory associated therewith is addressed, for example, by the invention of commonly-assigned U.S. Pat. No. 5,437,022 entitled "STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO", issued Jul. 25, 1995, which is incorporated herein by reference. The invention therein provides a storage controller with two cache memories, two nonvolatile storage buffers. The NVS memory of one cluster backs up a cache memory of the other cluster, such as through a processor (see FIG. 4). The storage controller also includes microcode for recovering from failure and reconfiguring the control unit thereof in response thereto. When DASD Fast Write is performed, the write data is transferred into the cache and NVS at the same time. The system is designed to provide continuous availability to extended function operations (e.g., DASD Fast Write and Dual Copy) even when a failure of cache or NVS occurs. (DASD Fast Write is an operation in which data to be written to the storage device is written to cache and backed up in nonvolatile memory. Dual Copy involves a designation of and preservation of data for later backup to a storage device.) Other commonly-assigned patents which are directed toward improving the robustness of storage sub-systems and reducing performance degradation in the event of a component failure include U.S. Pat. Nos. 6,006,342, entitled "FAILOVER AND FAILBACK SYSTEM OR A DIRECT ACCESS STORAGE DEVICE", issued Dec. 21, 1999, and 5,771,367 entitled "STORAGE CONTROLLER AND METHOD FOR IMPROVED FAILURE RECOVERY USING CROSS-COUPLED CACHE MEMORIES AND NONVOLATILE STORES", issued Jun. 23, 1998, both of which are incorporated herein by reference.

While NVS will maintain data in the event of a power failure, a disadvantage is that NVS requires a special, battery backed memory sub-system which increases the cost of a storage controller. One technique which does not employ NVS is for each cluster to transfer the entire cache to disk in the event of a power failure (see FIG. 5). When power is restored, the cache may be restored from the disk.

However, a disadvantage of such a "firehose dump" approach is that the amount of battery power required to process the transfer is proportional to the size of the memory to be protected. Consequently, the firehose dump approach is uneconomical in a system with a very large cache memory.

Moreover, in the event that one of the clusters fails to recover following the power failure, some portion of data, including modified data, may be unavailable to the customers of the data processing system.

Consequently, there remains a need for a system and technique for protecting data, especially modified data, in the event of a power failure or comparable occurrence without a special battery backed memory sub-system and to prevent the loss of data even if a cluster fails to be restored.

SUMMARY OF THE INVENTION

The need in the art is addressed by the system and method of the present invention. The inventive controller includes a first cluster for directing data from a host computer to a storage device and a second cluster for directing data from a host computer to a storage device. The first cluster includes a first cache memory, a first preserved area of memory and a first disk device; the second cluster includes a second cache memory, a second preserved area of memory and a second disk device. In a normal operating mode, modified data in the first cluster is directed to the first cache and backed up to the second preserved area (in the second cluster). Similarly, modified data in the second cluster is directed to the second cache and backed up to the first preserved area (in the first cluster). In the event of a power failure, modified data is copied from the first preserved area to the first disk device and from the second preserved area to the second disk device. Additionally, modified data is also copied from the first preserved area to the second disk device and from the second preserved area to the first disk device. Thus, if one of the clusters fails to recover after the power failure, the modified data from the failed cluster is available through the other cluster.

BRIEF DESCRIPTION OF THE DRAWINGS

FIG. 3 is a block diagram illustrating data flow of a prior art storage sub-system in which non-volatile storage maintains an image of the contents of a cluster cache;

FIG. 4 is a block diagram illustrating data flow of a prior art storage sub-system in which non-volatile storage of one cluster maintains at least some of the contents of the cache of another cluster;

FIG. 8C is a block diagram illustrating data flow of the storage sub-system of FIG. 7 in a third step in a failure mode following a power failure; and FIG. 9 is a block diagram illustrating data flow of the storage sub-system of FIG. 7 in a modified operating mode after one of the clusters fails to recover from the power failure.

DETAILED DESCRIPTION OF THE PREFERRED EMBODIMENT

Figure 1:
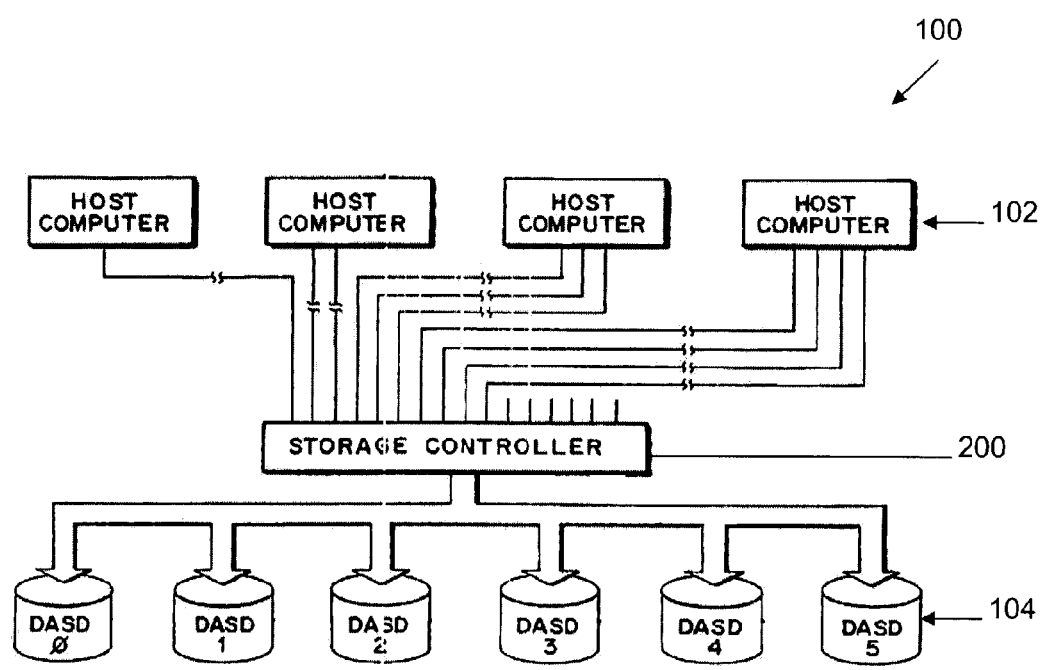
FIG. 1 is a block diagram of a data processing system, including a storage sub-system in which the present invention may be implemented.
Figure 2:
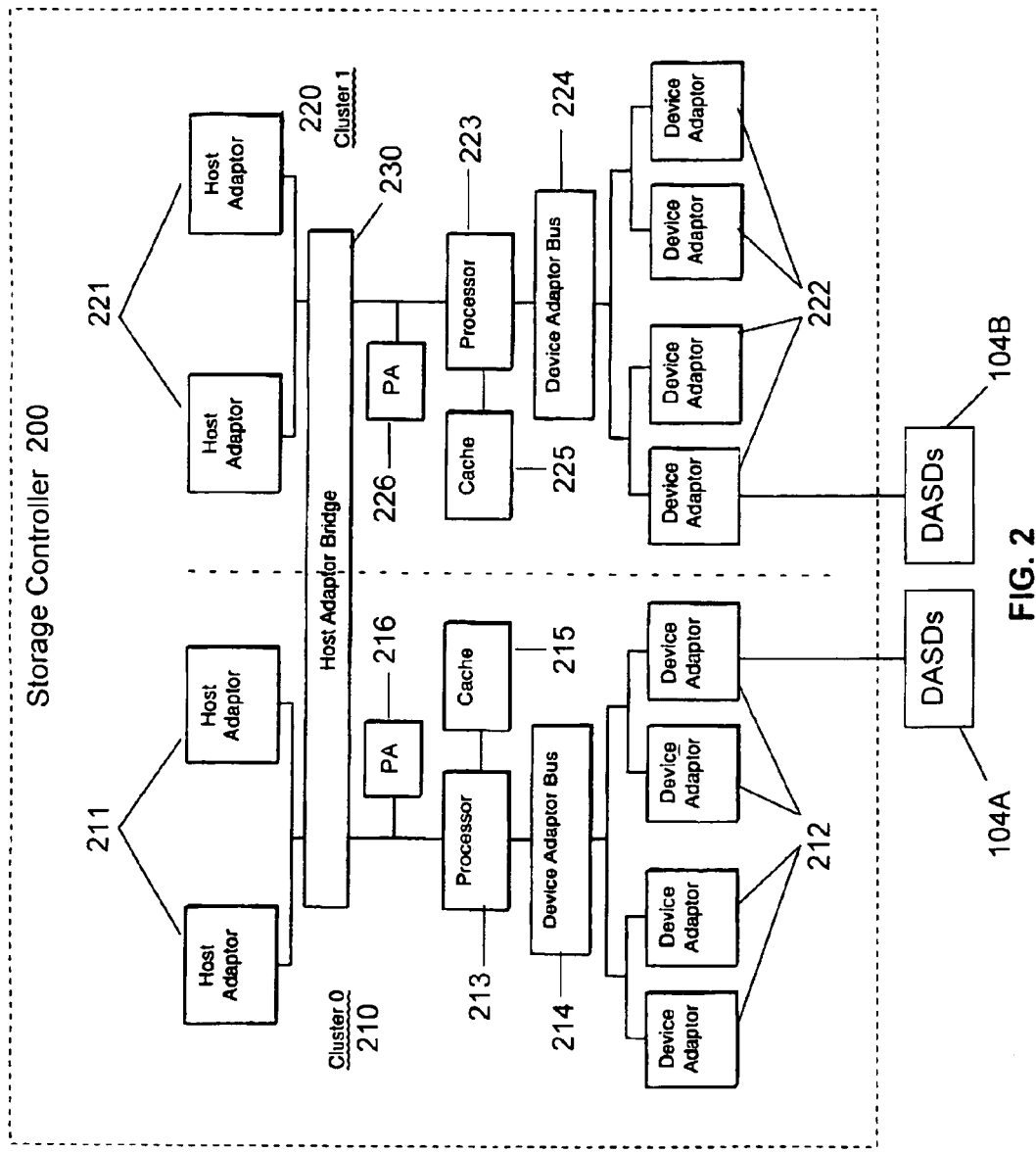
FIG. 2 is a block diagram of a storage sub-system in which the present invention may be implemented.
Figure 5:
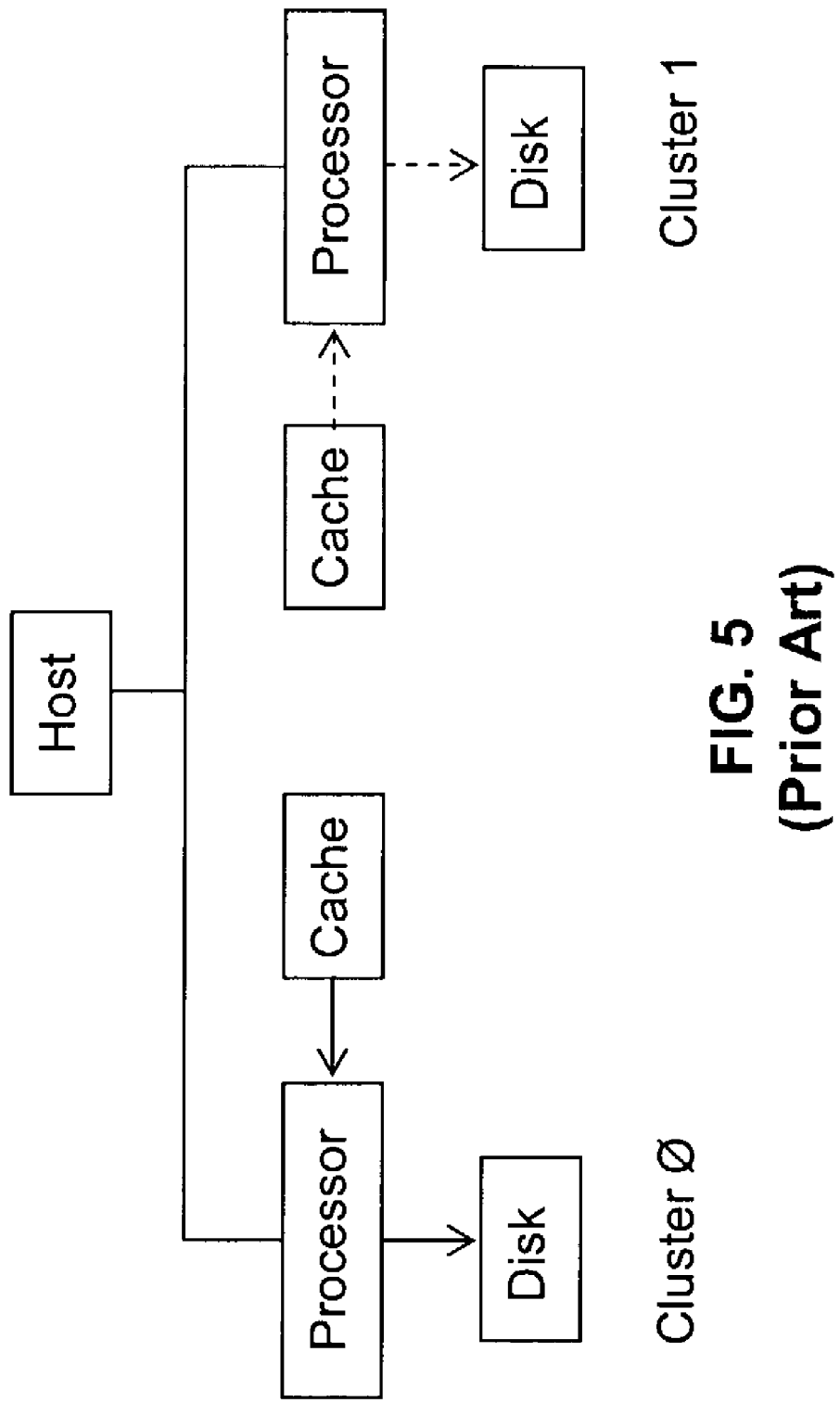
FIG. 5 is a block diagram of a prior art storage sub-system illustrating a "fire hose dump" being performed upon a power failure.

FIG. 1 a high level block diagram of a data processing system 100, including a storage sub-system in which the present invention may be implemented. The system 100 includes one or more host computers 102, one or more storage devices, such as direct access storage devices (DASDs) 104, and a storage controller 200 for managing the transfer of data between the host computers 102 and the storage devices 104. FIG. 2 is a block diagram of the storage controller 200 which is partitioned into clusters, such as cluster 0 210 and cluster 1 220. Although the storage controller 200 may be partitioned into more than two clusters, and the present invention is equally applicable to a storage controller with any number of clusters, for purposes of clarity, only two are illustrated and will be discussed herein. Each cluster 210 and 220 includes host adapters 211 and 221, through which host computers 102 are attached, and device adapters 212 and 222, through which the storage devices, such as DASDs 104A and 104B are attached. Each cluster 210 and 220 further includes a processor 213 and 223 which is programmed to manage operations in the cluster, a device adapter bus 214 and 224 between the corresponding device adapters 212 and 222 and processor 213 and 223, cache memory 215 and 225 coupled to the processor 213 and 223, and a preserved area of memory 216 and 226, also coupled to the processor 213 and 223. A host adapter bridge 230 interconnects the clusters 210 and 220.

Figure 6:
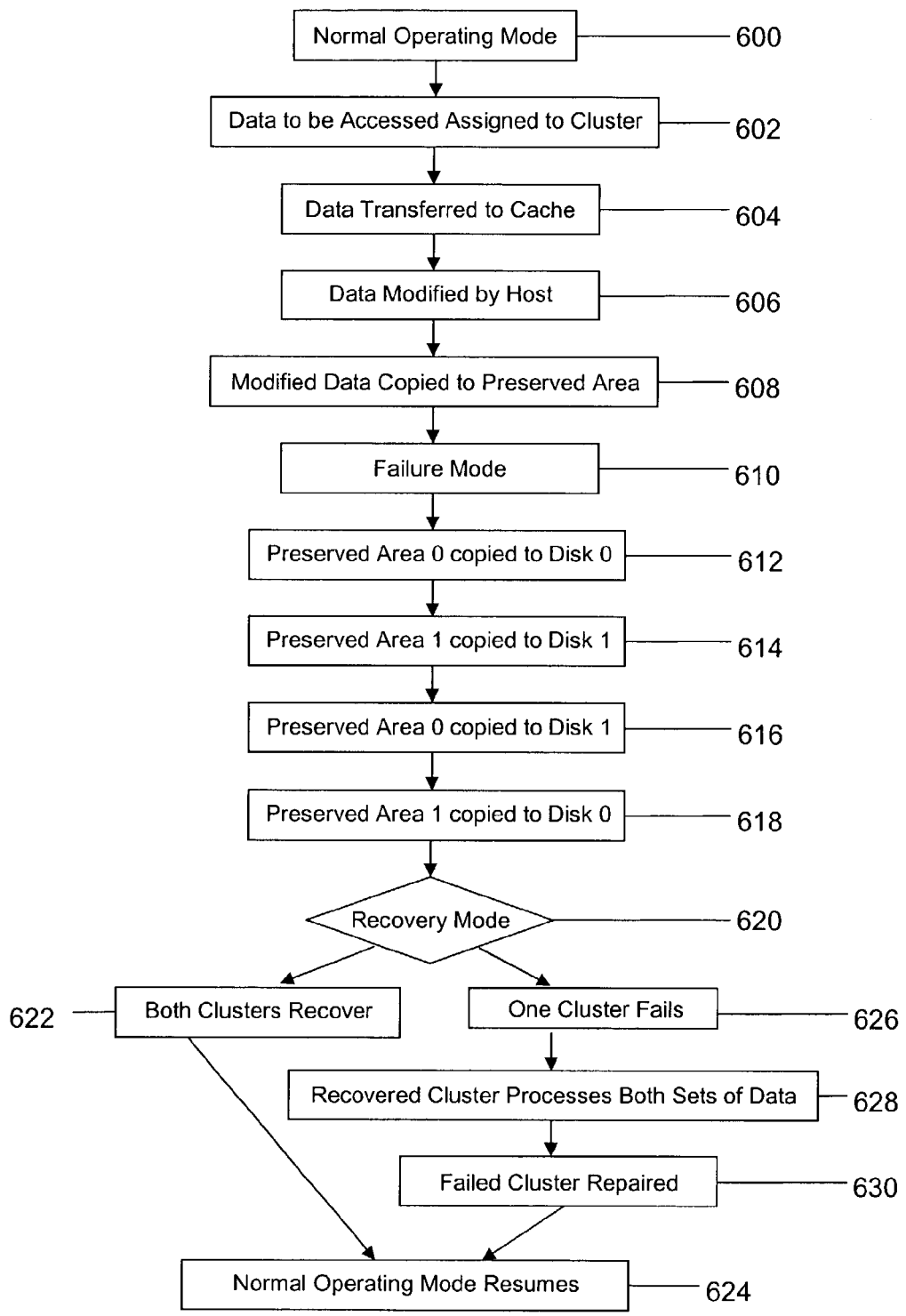
FIG. 6 is a flow chart of a method of the present invention.
Figure 7:
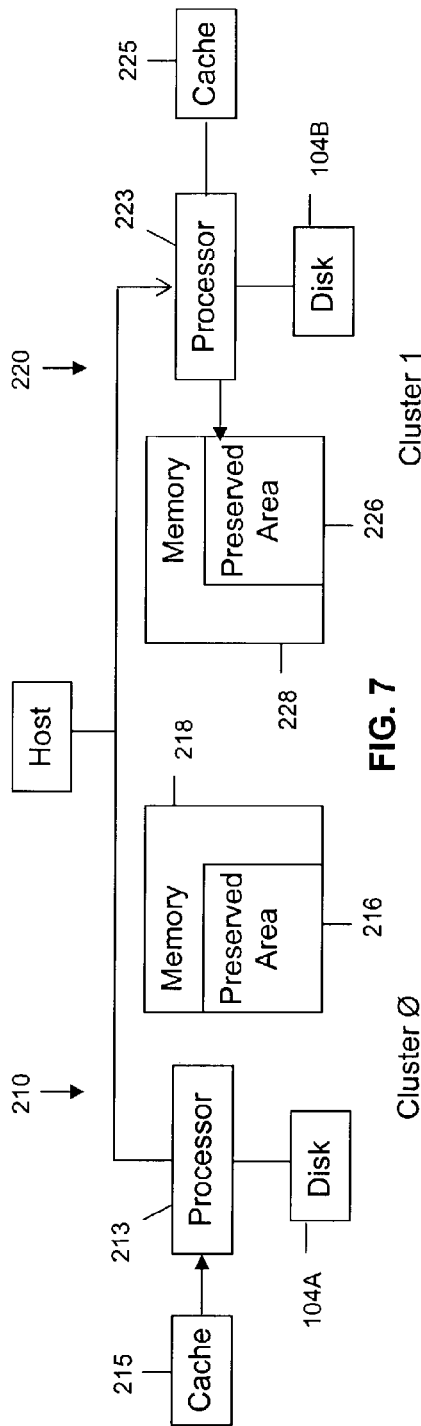
FIG. 7 is a block diagram illustrating data flow of a storage sub-system of the present invention in a normal operating mode.
Figure 8A:
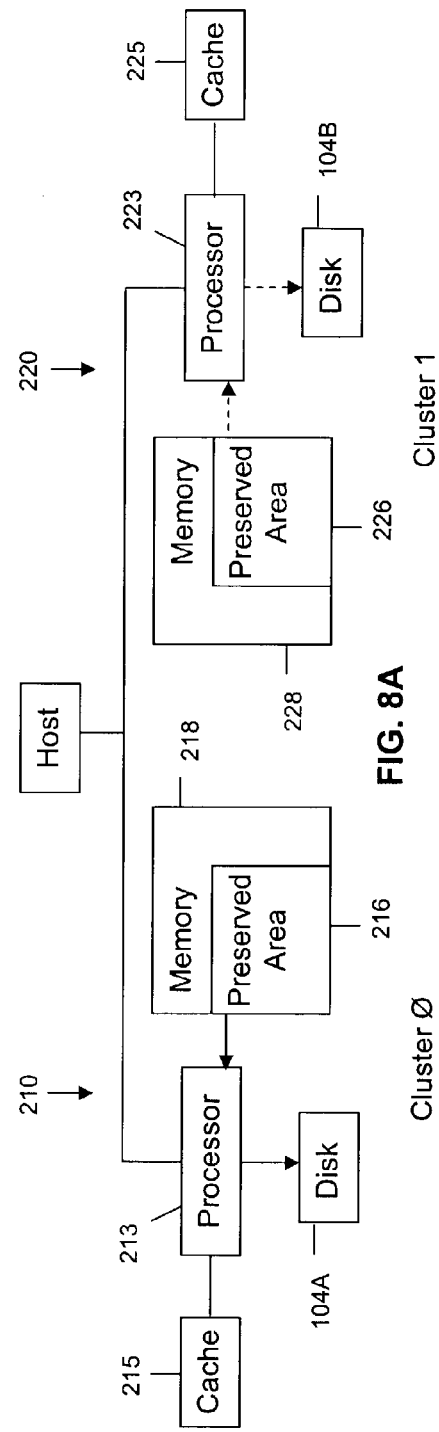
FIG. 8A is a block diagram illustrating data flow of the storage sub-system of FIG. 7 in a first step in a failure mode following a power failure.
Figure 8B:
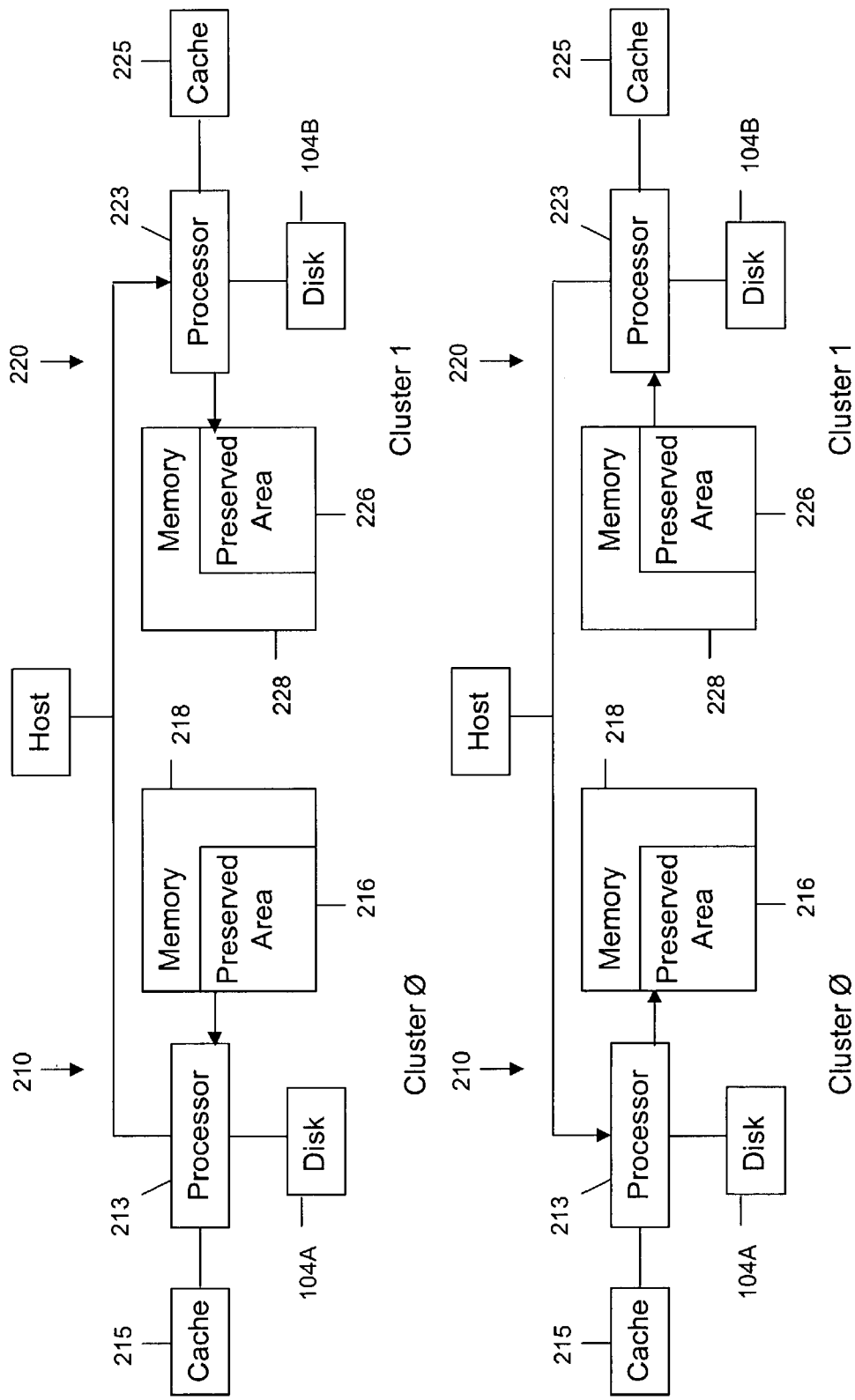
FIG. 8B is a block diagram illustrating data flow of the storage sub-system of FIG. 7 in a second step in a failure mode following a power failure.

FIG. 6 is a flow chart of a method of the present invention and will be discussed with reference to FIGS. 7–9. In a normal operating mode (step 600), data stored in storage device 104 to be accessed by a host computer 102 is assigned by the storage controller 200 to one of the clusters 210 or 220 (step 602) and transferred into a cache 215 or 225 (step 604). If the data is merely read by the host computer 102, no further action is necessary to protect the data: a power failure will not affect the original copy of the data stored in the storage device 104. However, if the host computer 102 modifies the data (step 606), the present invention provides protection (FIG. 7). Modified data in the cache 215 of the first cluster 210 is copied into the preserved area 226 of the second cluster 220. Similarly (but not illustrated), modified data in the cache 225 of the second cluster 220 is copied into the preserved area 216 of the first cluster 210 (step 608). Although the preserved areas 216 and 226 may be traditional battery-backed NVS, the preserved areas 216 and 226 may alternatively be a designated portion of the regular memory of each cluster 210 and 220. The size of memory allocated to the preserved areas 216 and 226 may be adjusted as necessary to accommodate the amount of modified data being processed. It will be appreciated that the amount of expensive NVS may not be easily changed and would require adding or removing memory modules and associated backup circuitry as well as reconfiguring the clusters to recognize the adjustment. And, there may be certain restrictions which would prohibit increasing the amount of NVS beyond a prescribed size. Preserving only modified data greatly reduces the battery requirements If a power loss or other comparable event (FIG. 8A; step 610), the storage controller 200 will continue to operate under a short-term battery and the processor 213 will direct that all of the data stored in the preserved area 216 of cluster 0 210 be saved to an attached disk 104A (step 612). Similarly, the processor 223 will direct that all of the data stored in the preserved area 226 of cluster 1 220 be saved to an attached disk 104B (step 614). Additionally, the processor 213 will direct that all of the data stored in the preserved area 216 of cluster 0 210 be temporarily stored in the preserved area 226 (or in more generic memory 228) of cluster 1 220 (FIG. 8B) and subsequently saved to the attached disk 104A (FIG. 8C; step 616). Similarly, the processor 223 will direct that all of the data stored in the preserved area 226 of cluster 1 220 be temporarily stored in the preserved area 216 (or in more generic memory 218) of cluster 0 210 and subsequently saved to the attached disk 104B (step 618). Thus, both clusters 210 and 220 will retain permanent copies of the modified data from both clusters 210 and 220.

Upon the conclusion of the power loss, an attempt is made to restore the storage controller 200 to normal operation (step 620). If both clusters 210 and 220 are fully restored (step 622), normal operations may resume with no loss of data (step 624). If one cluster (for example, cluster 1 220) fails its initial microcode load sequence or otherwise fails to recover from the power loss (step 626), the other cluster (cluster 0 210 in this example) may then continue to process its own data (recovered from the disk 104A) as well as the data from the failed cluster 220 (also recovered from the disk 104A) (FIG. 9; step 628). After the failed cluster 220 is repaired (step 630), normal two-cluster operation may then resume (step 624).

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims. For example, although the description of the present invention has been made in the context of a two-cluster storage controller, it may also be implemented in a storage controller having more than two clusters. In one such embodiment, the preserved area of each cluster is copied to the attached disk of each cluster in the event of a power failure or other comparable occurrence, thereby protecting modified data even if all but one cluster fails to recover. Alternatively, clusters may be paired to support each other. The latter embodiment would reduce the amount of disk space, logic and time required for data protection relative to the former embodiment.

What is claimed is:

1. A method for storing data in a data processing system having a storage controller coupled to at least one host computer, the method comprising:
   directing first modified data in a first cluster of the storage controller be stored in a preserved area of memory of a second cluster of the storage controller in a normal operating mode;
   directing second modified data in the second cluster be stored in a preserved portion of memory of the first cluster in the normal operating mode;
   upon detection of a power failure in the storage controller:
      continuing to operate the storage controller under temporary battery power:
      directing the first modified data be stored in a first disk storage device in the first cluster;
      directing the second modified data be stored in a second disk storage device in the second cluster;
      directing the first modified data be transferred from the preserved area of the second cluster to the second disk storage device; and
      directing the second modified data be transferred from the preserved area of the first cluster to the first disk storage device; attempting to restore the storage controller to the normal operating mode;
   upon a failure of the first cluster to recover after the power failure, enabling the second cluster to process the first modified data of the first cluster through the second storage device.

2. The method of claim 1, wherein:
the method further comprises;
   storing the first modified data in the preserved area of the first cluster; and
   storing the second modified data in the preserved area of the second cluster;
directing the first modified data be transferred from the preserved area of the second cluster to the second disk storage device comprises:
   directing the first modified data be transferred from the preserved area of the first cluster to the preserved area of the second cluster; and
   directing the first modified data be transferred from the preserved area of the second cluster to the second storage device; and
directing the second modified data be transferred from the preserved area of the first cluster to the first disk storage device comprises:
   directing the second modified data be transferred from the preserved area of the second cluster to the first preserved area of the first cluster; and
   directing the second modified data be transferred from the preserved area of the first cluster to the first disk storage device.

3. The method of claim 1, further comprising:
adjusting the capacity of the preserved area of the first cluster to accommodate the first and second modified data; and
adjusting the capacity of the preserved area of the second cluster to accommodate the first and second modified data.

4. The method of claim 1, further comprising:
providing the preserved area of the first cluster with temporary non-volatile storage means whereby data stored in the preserved area of the first cluster is preserved until such data is transferred to the first disk storage device; and
providing the preserved area of the second cluster with temporary non-volatile storage means whereby data stored in the preserved area of the second cluster is preserved until such data is transferred to the second disk storage device.

5. A storage controller, comprising:
a first cluster for directing the storage of data from a host computer, the first cluster comprising:
   a first cache memory;
   a first preserved area of memory;
   a first disk storage device;
a second cluster for directing the storage of data from a host computer, the second cluster comprising:
   a second cache memory;
   a second preserved area of memory;
   a second disk storage device;
means for directing first modified data be stored in the preserved area of the second cluster in a normal operating mode;
means for directing second modified data be stored in the preserved area of the first cluster in the normal operating mode;
means for detecting a power failure in the storage controller;

a battery operable to temporarily operate the storage controller in a power failure mode:

means for, while the storage controller is in the power failure mode, directing the first modified data be stored in the first disk storage device;

means for, while the storage controller is in the power failure mode, directing the second modified data be stored in the second disk storage device;

means for, while the storage controller is in the power failure mode, directing the first modified data be transferred from the preserved area of the second cluster to the second disk storage device; and means for, while the storage controller is in the power failure mode, directing the second modified data be transferred from the preserved area of the first cluster to the first disk storage device;

means for enabling the second cluster to process the first modified data of the first cluster through the second storage device if the first cluster fails to recover after the power failure.

6. The storage controller of claim 5, wherein:

the first preserved area comprises temporary non-volatile storage means whereby data stored in the first preserved area is preserved until such data is transferred to the first disk storage device; and the second preserved area comprises temporary non-volatile storage means whereby data stored in the second preserved area is preserved until such data is transferred to the second disk storage device.

7. The storage controller of claim 5, further comprising:

means for adjusting the capacity of the preserved area of the first cluster to accommodate the first and second modified data; and means for adjusting the capacity of the preserved area of the second cluster to accommodate the first and second modified data.

8. A data processing system, comprising:

at least one host computer;

at least one storage device;

a storage controller, comprising:

a first cluster for directing the storage of data from a host computer, the first cluster comprising:

a first cache memory;

a first preserved area of memory;

a first disk storage device;

a second cluster for directing the storage of data from a host computer, the second cluster comprising:

a second cache memory;

a second preserved area of memory;

a second disk storage device;

means for directing first modified data be stored in the second preserved area in a normal operating mode;

means for directing second modified data be stored in the first preserved area in the normal operating mode;

means for detecting a power failure in the storage controller;

a battery operable to temporarily operate the storage controller in a power failure mode:

means for, while the storage controller is in the power failure mode, directing the first modified data be stored in the first disk storage device;

means, while the storage controller is in the power failure mode, for directing the second modified data be stored in the second disk storage device;

means for, while the storage controller is in the power failure mode, for directing the first modified data be transferred from the preserved area of the second cluster to the second disk storage device; and means, while the storage controller is in the power failure mode, for directing the second modified data be transferred from the preserved area of the first cluster to the first disk storage device;

means for enabling the second cluster to process the first modified data of the first cluster through the second storage device if the first cluster fails to recover after the power failure.

9. The data processing system of claim 8, wherein:

the first preserved area comprises temporary non-volatile storage means whereby data stored in the first preserved area is preserved until such data is transferred to the first disk storage device; and the second preserved area comprises temporary non-volatile storage means whereby data stored in the second preserved area is preserved until such data is transferred to the second disk storage device.

10. The data processing system of claim 8, further comprising:

means for adjusting the capacity of the preserved area of the first cluster to accommodate the first and second modified data; and means for adjusting the capacity of the preserved area of the second cluster to accommodate the first and second modified data.

11. An article of manufacture for use in programming a storage controller to direct the transfer of data between host systems and storage devices, the article of manufacture comprising a storage medium having logic embedded therein to cause components of the storage controller to perform the steps of:

directing first modified data in a first cluster of the storage controller be stored in a preserved area of memory of a second cluster in a normal operating mode;

directing second modified data in the second cluster of the storage controller be stored in a preserved portion of memory of the first cluster in the normal operating mode;

upon detection of a power failure in the storage controller;

continuing to operate the storage controller under temporary battery power;

directing the first modified data be stored in a first disk storage device in the first cluster;

directing the second modified data be stored in a second disk storage device in the second cluster;

directing the first modified data be transferred from the preserved area of the second cluster to the second disk storage device; and directing the second modified data be transferred from the preserved area of the first cluster to the first disk storage device; attempting to restore the storage controller to the normal operating mode;

upon failure of the first cluster to recover after a power failure, enabling the second cluster to process the first modified data of the first cluster through the second storage device.

12. The article of manufacture of claim 11, wherein:

the logic further causes components of the storage controller to perform the steps of;

storing the first modified data in the preserved area of the first cluster; and storing the second modified data in the preserved area of the second cluster;

the steps of directing the first modified data be transferred from the preserved area of the second cluster to the second disk storage device comprise the steps of:

directing the first modified data be transferred from the preserved area of the first cluster to the preserved area of the second cluster; and directing the first modified data be transferred from the preserved area of the second cluster to the second disk storage device; and the steps of directing the second modified data be transferred from the preserved area first cluster to the first disk storage device comprise the steps of:

directing the second modified data be transferred from the preserved area of the second cluster to the preserved area of the first cluster; and directing the second modified data be transferred from the preserved area of the first cluster to the first disk storage device.

13. The article of manufacture of claim 11, wherein the logic further causes components of the storage controller to perform the steps of:

adjusting the capacity of the preserved area of the first cluster to accommodate the first and second modified data; and adjusting the capacity of the preserved area of the second cluster to accommodate the first and second modified data.

14. The article of manufacture of claim 11, wherein the logic further causes components of the storage controller to perform the steps of:

providing the preserved area of the first cluster with temporary non-volatile storage means whereby data stored in the preserved area first cluster is preserved until such data is transferred to the first disk storage device; and providing the preserved area of the second cluster with temporary non-volatile storage means whereby data stored in the preserved area of the second cluster is preserved until such data is transferred to the second disk storage device.

* * * * *